United States Patent
Kato et al.

(10) Patent No.: US 11,377,358 B2
(45) Date of Patent: Jul. 5, 2022

(54) METHOD FOR PRODUCING POROUS CARBON MATERIAL

(71) Applicants: TOHOKU TECHNO ARCH CO., LTD., Sendai (JP); TPR CO., LTD., Tokyo (JP)

(72) Inventors: Hidemi Kato, Sendai (JP); Masashi Tsuda, Sendai (JP); Yugo Takano, Sagae (JP); Yosuke Suzuki, Sagae (JP); Tsutomu Chino, Sagae (JP); Koji Kamata, Sagae (JP); Shota Muronaka, Nagoya (JP)

(73) Assignees: TOHOKU TECHNO ARCH CO., LTD., Sendai (JP); TPR CO., LTD., Tokyo (JP)

(\*) Notice: Subject to any disclaimer, the term of this patent is extended or adjusted under 35 U.S.C. 154(b) by 297 days.

(21) Appl. No.: 16/802,722

(22) Filed: Feb. 27, 2020

(65) Prior Publication Data
US 2020/0198979 A1 Jun. 25, 2020

Related U.S. Application Data

(62) Division of application No. 16/078,470, filed as application No. PCT/JP2016/086357 on Dec. 7, 2016, now Pat. No. 11,180,374.

(30) Foreign Application Priority Data

Mar. 4, 2016 (JP) .............................. JP2016-041914

(51) Int. Cl.
| | |
|---|---|
| *C01B 31/08* | (2006.01) |
| *C01B 32/348* | (2017.01) |
| *C22C 1/10* | (2006.01) |
| *C22C 32/00* | (2006.01) |
| *C01B 32/30* | (2017.01) |
| *C01B 32/306* | (2017.01) |

(52) U.S. Cl.
CPC ............ *C01B 32/348* (2017.08); *C01B 32/30* (2017.08); *C01B 32/306* (2017.08); *C22C 1/1005* (2013.01); *C22C 32/0084* (2013.01); *C01P 2002/82* (2013.01); *C01P 2004/03* (2013.01); *C01P 2006/12* (2013.01); *C01P 2006/16* (2013.01)

(58) Field of Classification Search
CPC ................................ C01B 32/30; C01B 32/05
See application file for complete search history.

(56) References Cited

U.S. PATENT DOCUMENTS

| | | | |
|---|---|---|---|
| 4,957,897 A | 9/1990 | Maroldo et al. | |
| 5,714,433 A | 2/1998 | Farmer et al. | |
| 6,064,560 A | 5/2000 | Hirahara et al. | |
| 6,194,344 B1 | 2/2001 | Tsuchitani et al. | |
| 8,227,376 B2 | 7/2012 | Karles et al. | |
| 2011/0097583 A1 | 4/2011 | Tenninson et al. | |
| 2013/0273460 A1 | 10/2013 | Moon et al. | |

FOREIGN PATENT DOCUMENTS

| | | |
|---|---|---|
| DE | 4328219 A1 | 2/1995 |
| JP | 2006-075708 A | 3/2006 |
| JP | 4762424 B2 | 8/2011 |
| JP | 2011-225430 A | 11/2011 |
| JP | 2012-101355 A | 5/2012 |
| JP | 2014-522355 A | 9/2014 |
| WO | 03/006372 A1 | 1/2003 |
| WO | 2005/097674 A1 | 10/2005 |
| WO | 2011/078145 A1 | 6/2011 |
| WO | 2011/092909 A1 | 8/2011 |
| WO | 2012/131628 A1 | 10/2012 |

OTHER PUBLICATIONS

Barsoum, 'The Topotactic Transformation of Ti3SiC2 into a Partially Ordered Cubic Ti(C0.67Si0.06) Phase by the Diffusion of Si into Molten Cryolite' in Journal of The Electrochemical Society vol. 146 #10 pp. 3919-3923 (1999). (Year: 1999).*
Feb. 14, 2017 International Search Report issued in International Patent Application No. PCT/JP2016/086357.
Dec. 11, 2018 extended search report issued in European Patent Application 16892721.8.
Lei Zhang et al.; "A new route for preperation of titanium carbide derived carbon and it's performance for supercapacitors" Materials Letters; vol. 122; Feb. 8, 2014; pp. 78-81.
Apr. 6, 2020 Office Action issued in U.S. Appl. No. 16/078,470.
Sep. 8, 2020 Office Action issued in U.S. Appl. No. 16/078,470.
Mar. 2, 2021 Office Action Issued in U.S. Appl. No. 16/078,470.
Jun. 11, 2021 Office Action Issued in U.S. Appl. No. 16/078,470.

\* cited by examiner

*Primary Examiner* — Stuart L Hendrickson
(74) *Attorney, Agent, or Firm* — Oliff PLC

(57) ABSTRACT

A novel method for producing a porous carbon material which makes it possible to easily produce a porous carbon material having a desired shape. The method includes immersing a carbon-containing material having a desired shape and composed of a compound, alloy or non-equilibrium alloy containing carbon in a metal bath, the metal bath having a solidification point that is lower than a melting point of the carbon-containing material, the metal bath being controlled to a lower temperature than a minimum value of a liquidus temperature within a compositional fluctuation range extending from the carbon-containing material to carbon by decreasing the other non-carbon main components, to thereby selectively elute the other non-carbon main components into the metal bath while maintaining an external shape of the carbon-containing material to give a porous carbon material having microvoids.

8 Claims, 4 Drawing Sheets

(a)

(b)

METHOD FOR PRODUCING POROUS CARBON MATERIAL

This is a Division of application Ser. No. 16/078,470, which is a National Phase of International Application No. PCT/JP2016/086357 filed Dec. 7, 2016, which claims the benefit of Japanese Application No. 2016-041914 filed Mar. 4, 2016. The disclosures of the prior applications are hereby incorporated by reference herein in their entireties.

FIELD OF THE INVENTION

The present invention relates to methods for producing porous carbon materials and spherical porous carbon materials.

DESCRIPTION OF RELATED ART

Porous carbon materials, such as activated carbon, have been conventionally applied to a variety of uses including electrodes for various kinds of batteries by taking advantage of e.g., a high reaction efficiency due to a huge specific surface area (see, for example, Patent Literature 1). Since different applications demand different properties and qualities in the porous carbon materials, it is a key to obtain porous carbon materials having desired properties and qualities.

Methods for producing porous carbon materials having desired properties and qualities include, for example, a method which includes a step of using a blend composition to obtain a polymer, the blend composition given by immersing a polymerizable monomer or a composition containing the monomer in a colloid crystal insoluble to the monomer or to the composition, a step of calcination performed under an inert gas atmosphere at 800 to 3000° C., and a step of immersion in a colloid crystal-soluble solvent to dissolve and remove the colloid crystal, and which as a result provides a porous carbon material with voids that macroscopically form a crystalline structure and are arranged in a configuration having a three-dimensional regularity (see, for example, Patent Literature 2); and a method which includes mixing a polymer A that is a copolymer of an acrylonitrile monomer and a hydrophilic vinyl monomer, such as a polyacrylonitrile copolymer, with a different kind of polymer B in an organic solvent to form an emulsion, bringing the emulsion into contact with a poor solvent for the polymer A to precipitate the polymer A thereby giving child particle-containing synthetic resin fine particles, and performing carbonization/calcination of the child particle-containing synthetic resin fine particles, and which as a result provides a porous carbon material having a narrow particle size distribution and having a porous structure of a specific size (see, for example, Patent Literature 3).

On the other hand, the present inventors have already developed a so-called dealloying using metallic melt method capable of producing metal members with micropores on their surface or in their entirety (see, for example, Patent Literature 4).

CITATION LIST

Patent Literature 1: JP-B-4762424
Patent Literature 2: JP-A-2012-101355
Patent Literature 3: JP-A-2011-225430
Patent Literature 4: WO 2011/092909

SUMMARY OF THE INVENTION

The methods described in Patent Literatures 2 and 3 for producing porous carbon materials can produce porous carbon materials having properties and qualities that meet respective demands, but a problem with those methods is the failure to produce porous carbon materials having a desired shape. Another problem with those methods is complexity of steps in producing the porous carbon materials.

The present invention has been made focusing on those problems. It is an object of the present invention to provide a novel method for producing a porous carbon material which makes it possible to easily produce a porous carbon material having a desired shape; and a spherical porous carbon material.

To attain the above object, the method according to the present invention for producing a porous carbon material includes bringing a carbon-containing material having a desired shape and composed of a compound, alloy or non-equilibrium alloy containing carbon into contact with a molten metal, the molten metal having a solidification point that is lower than a melting point of the carbon-containing material, the molten metal being controlled to a lower temperature than a minimum value of a liquidus temperature within a compositional fluctuation range extending from the carbon-containing material to carbon by decreasing the other non-carbon main components, to thereby selectively elute the other non-carbon main components into the molten metal while maintaining an external shape of the carbon-containing material to give the carbon material having microvoids.

In the method according to the present invention for producing a porous carbon material, selectively eluting the other non-carbon main components from the carbon-containing material into a molten metal leads to the repeated bonding between residual carbons, resulting in forming particles with a nanometer dimension. In addition, this operation causes those particles to partially bond to one another, consequently giving bulk porous carbon material having microvoids such as meso pores (diameter: 2 nm to 60 nm) and macro pores (diameter: 60 nm or more). The elution of the other non-carbon main components and the formation and bonding of the particles make progress while maintaining an external shape of the carbon-containing material. As a result, a porous carbon material having the same shape as the external shape of the carbon-containing material is obtainable. Thus, the use of a carbon-containing material having a desired shape leads to obtaining a porous carbon material having a desired shape.

The method according to the present invention for producing a porous carbon material, which utilizes a so-called dealloying using metallic melt method, is an entirely novel method that has hitherto not existed for producing a porous carbon material. In the method according to the present invention for producing a porous carbon material, the regulation of a temperature of a molten metal suffices in order to obtain the porous carbon material having a desired shape with relative ease at a low cost. In the method according to the present invention for producing a porous carbon material, making changes in a temperature of a molten metal, duration of contacting a carbon-containing material with a molten metal, and a carbon component proportion within a carbon-containing material, can make a difference in void size and void ratio in a target porous carbon material.

In the method according to the present invention for producing a porous carbon material, it is preferred that the carbon-containing material is formed to have a desired shape before being brought into contact with the molten metal. By doing so, a porous carbon material with any shape, such as a sheet shape and a spherical shape, is readily producible. In particular, a possible way is that the carbon-containing material is formed to be spherical by rapidly cooling to solidify a carbon-containing metal melt and thereafter the carbon-containing material with such a shape is brought into contact with the molten metal to thereby give a spherical carbon material having microvoids. In this way, a spherical porous carbon material is readily producible. An exemplary way of forming the carbon-containing material that has sphericity is an atomizing method.

In the method according to the present invention for producing a porous carbon material, as long as it is possible for the other non-carbon main components of the carbon-containing material to be eluted into the molten metal, the carbon-containing material may be brought into contact with the molten metal in any manner. For instance, a possible way is that the carbon-containing material is immersed in a metal bath composed of the molten metal to thereby selectively elute the other non-carbon main components into the metal bath to give the carbon material. Another possible way is that a solid metal having a solidification point that is lower than a melting point of the carbon-containing material is arranged so as to contact the carbon-containing material and thereafter the solid metal is heated and turned into the molten metal to thereby selectively elute the other non-carbon main components into the molten metal to give the carbon material.

In the method according to the present invention for producing a porous carbon material, it is preferred that the carbon material is released from the molten metal and thereafter is subjected to an acid or alkali aqueous solution to selectively elute and remove an adherent mixture alone that has adhered to a periphery of the carbon material or to an inside of the microvoids and that includes components of the molten metal and/or the other non-carbon main components. The use of an acid or alkali aqueous solution enabling the adherent mixture alone to be selectively eluted and not eluting carbon leads to obtaining the porous carbon material having a desired shape which is composed of carbon as a main component and from which the adherent mixture is removed. The adherent mixture, before its removal, can adhere to a periphery of the resultant carbon material or partially to an inside of the microvoids, or fill the inside of the microvoids.

In the method according to the present invention for producing a porous carbon material, it is preferred that the molten metal is composed of Ag, Bi, Cu, Ga, Ge, Hg, In, Ir, Pb, Pt, Rh, Sb, Sn, or Zn, or is composed of a mixture that is an alloy of at least one of those components as a main component, and that the other non-carbon main components are composed of any one or a mixture including more than one of Al, B, Be, Ca, Ce, Cr, Dy, Er, Eu, Fe, Gd, Hf, Ho, K, La, Li, Lu, Mg, Mn, Mo, Na, Nb, Nd, Pr, Sc, Se, Si, Sm, Sr, Ta, Ti, V, W and Zr. In this case, the porous carbon material with a desired shape is producible with particular efficiency.

In the method according to the present invention for producing a porous carbon material, it is preferred that the step of selectively eluting the other non-carbon main components into the molten metal is performed in an inert atmosphere or a vacuum atmosphere, or performed in air with flux added to the molten metal. By doing so, the oxidization of the molten metal can be prevented.

A spherical porous carbon material according to the present invention has sphericity and includes microvoids. It is preferred that the spherical porous carbon material according to the present invention contains 80% or more of pores ranging in size between 2 to 200 nm in a volume of all pores and has a BET specific surface area of 100 $m^2/g$ or more. It is preferred that the spherical porous carbon material according to the present invention is produced particularly by the method according to the present invention for producing a porous carbon material.

The present invention provides a novel method for producing a porous carbon material which makes it possible to easily produce a porous carbon material having a desired shape; and also provides a spherical porous carbon material.

DETAILED DESCRIPTION OF THE INVENTION

Embodiments of the present invention will be described with reference to examples hereinafter.

Figure 1:
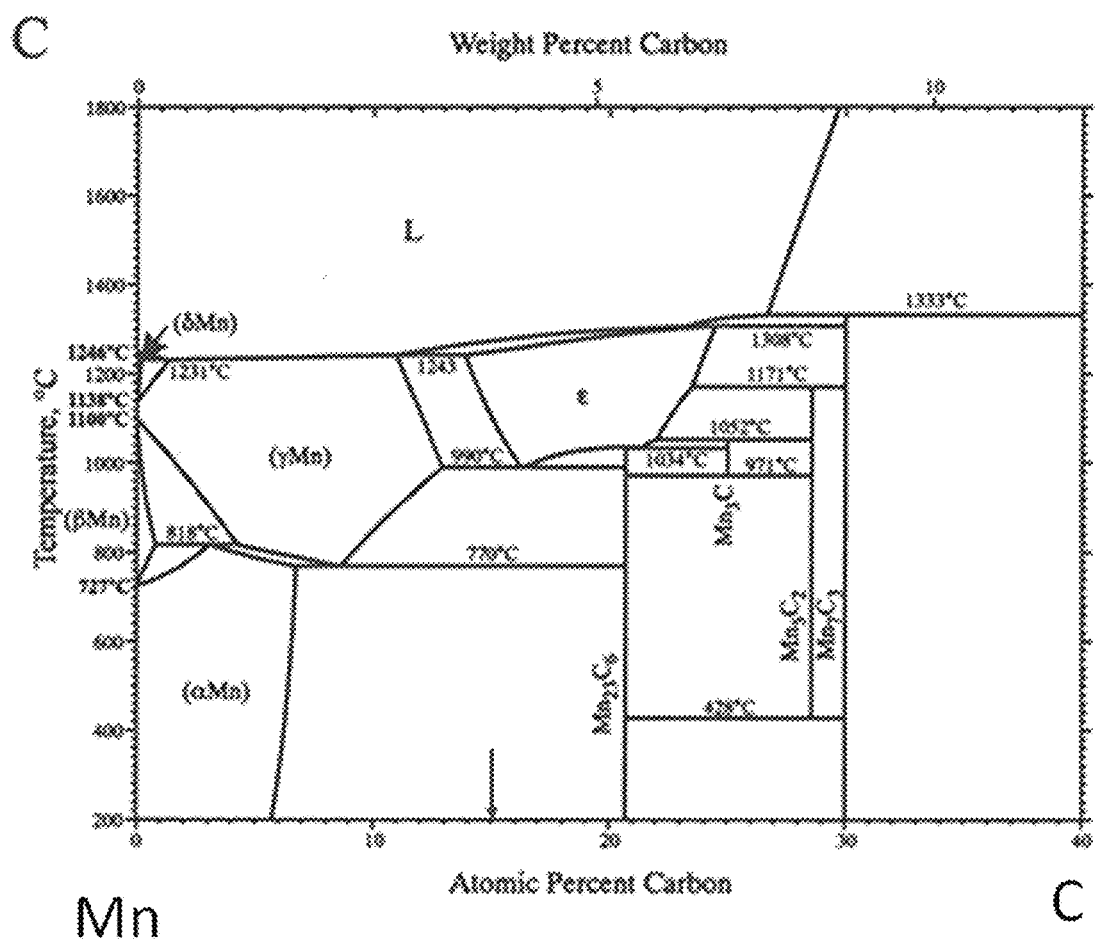
FIG. 1 shows a Mn—C phase diagram.

A first thing to do in a method in an embodiment of the present invention for producing a porous carbon material is the preparation of a precursor having a desired shape serving as a carbon-containing material. The precursor is composed of a compound, alloy or non-equilibrium alloy containing carbon and other non-carbon main components. For instance, reference is made to a Mn—C phase diagram shown in FIG. 1 to prepare a Mn—C precursor alloy where the components other than carbon are Mn. In view of the general tendency of Mn and a melt of its alloy being readily oxidizable, the melting is done preferably in an inert atmosphere such as argon.

Figure 2:
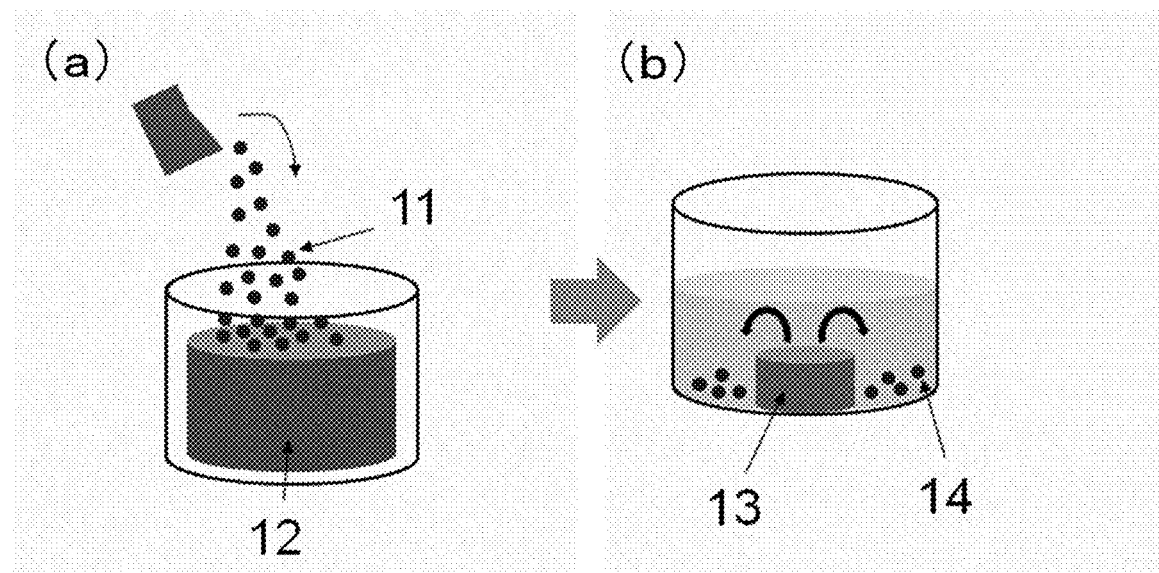
FIG. 2 is a schematic perspective view illustrating (a) a step of immersing a carbon-containing material in a metal bath and (b) a step of washing a porous carbon material, in a method in an embodiment of the present invention for producing a porous carbon material.

Subsequently, as shown in FIG. 2 (a), the prepared precursor, i.e., a carbon-containing material 11, is immersed for a prescribed amount of time in a metal bath 12 having a solidification point that is lower than a melting point of the carbon-containing material 11. At this time, the metal bath 12 is controlled to a lower temperature than a minimum value of a liquidus temperature within a compositional fluctuation range extending from the carbon-containing material 11 to carbon by decreasing the other non-carbon main components. For example, in the case of the carbon-containing material 11 that is a Mn—C precursor alloy, the metal bath 12 is controlled to a lower temperature than a minimum value of a liquidus temperature, 1231° C., in a compositional fluctuation range extending to C by decreasing Mn, as determined from the phase diagram shown in FIG. 1. In this case, it is preferred that the metal bath 12 is at 600° C. or higher in view of the fact that reaction is unlikely to take place at a temperature below 600° C.

The duration of the immersion in the metal bath 12 varies depending on components of the metal bath 12 and of the precursor serving as the carbon-containing material 11, but is around 5 to 10 minutes, for example, when using the metal bath 12 that is a Bi melt or an Ag melt into which the carbon-containing material 11 that is a Mn—C precursor is immersed. When using the metal bath 12 that is a Bi melt into which the carbon-containing material 11 that is a Mn—C precursor is immersed, floating of the powdery Mn—C precursor occurs on the surface of the melt due to density difference, so it is preferred during the immersion to stir the precursor and the melt using a rod, for example. In view of the general tendency of Bi and a melt of its alloy being readily oxidizable, performing the dealloying step involving the use of the metal bath 12 is done preferably in an inert atmosphere such as argon or in a vacuum atmosphere.

The immersion into the metal bath 12 causes the other non-carbon main components (e.g., Mn) to be selectively eluted from the carbon-containing material 11 into the metal bath 12. This operation leads to the repeated bonding between carbons remaining in the metal bath 12, resulting in forming particles with a nanometer dimension. In addition, this operation causes those particles to partially bond to one another, consequently giving a bulk porous carbon material 13 having microvoids such as meso pores (diameter: 2 nm to 60 nm) and macro pores (diameter: 60 nm or more). The elution of the other non-carbon main components and the formation and bonding of the particles make progress while maintaining an external shape of the carbon-containing material 11. As a result, the porous carbon material 13 having the same shape as the external shape of the carbon-containing material 11 is obtainable. Thus, the use of the carbon-containing material 11 having a desired shape leads to obtaining the porous carbon material 13 having a desired shape.

Meanwhile, because of the possibility that an unreacted precursor 14 remains at the vicinity of the surface of the melt, a surface of the bulk porous carbon material 13 that has been taken out from the metal bath 12 can have the adhering of the unreacted precursor 14. In view thereof, as shown in FIG. 2 (b), the unreacted precursor 14 adhering onto the surface of the porous carbon material 13 is removed by washing using e.g., an ultrasonic cleaning machine.

Figure 3:
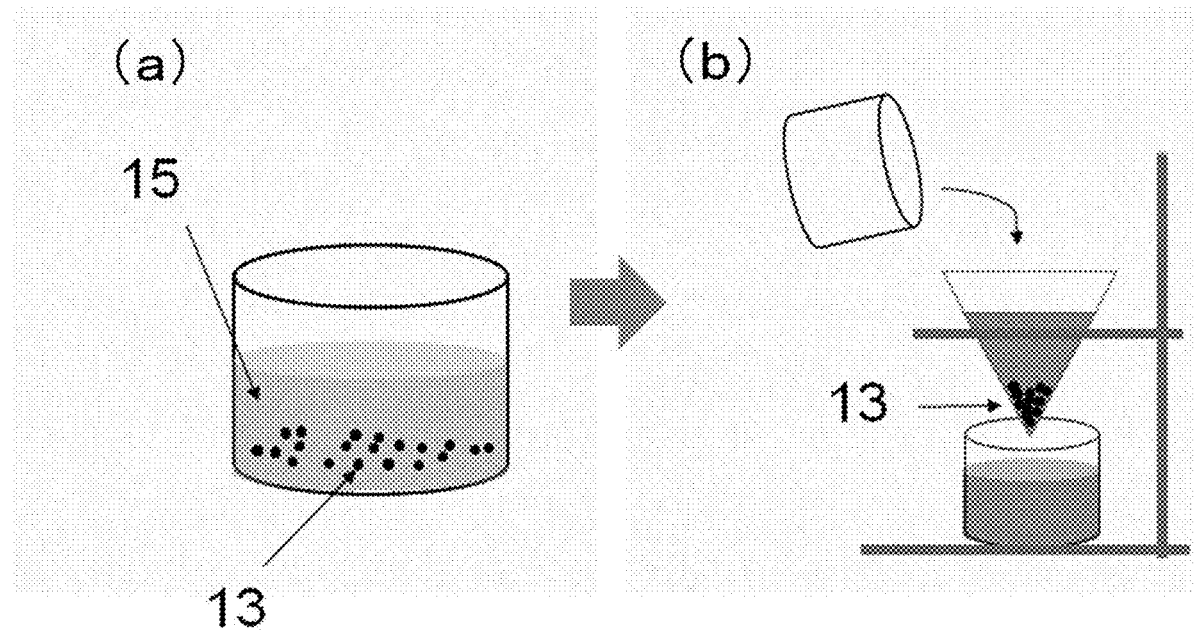
FIG. 3 is a schematic perspective view illustrating (a) a step of removing an adherent mixture and (b) a step of collecting a porous carbon material, in a method in an embodiment of the present invention for producing a porous carbon material.

The periphery of the porous carbon material 13 and the inside of the microvoids have the adhering of an adherent mixture including components of the metal bath 12 and/or the other non-carbon main components (e.g., Mn). As shown in FIG. 3 (a), in order for the adherent mixture alone to be selectively eluted and removed, the porous carbon material 13 obtained is introduced into an acid or alkali aqueous solution 15. In an instance shown in FIG. 3 (a), the aqueous solution 15 into which the porous carbon material 13 is introduced is an aqueous nitric acid solution. First, the porous carbon material 13 is put in e.g., a beaker, into which distilled water in such an amount as will immerse the porous carbon material is poured. This is followed by a little-by-little introduction of nitric acid, which then causes reaction between nitric acid and the adherent mixture, resulting in the elution of the adherent mixture. Thereafter, as shown in FIG. 3 (b), the solid part of the porous carbon material 13 is collected by means such as filtration, and water-washed and dried. This operation results in giving the porous carbon material 13 having a desired shape which is composed of carbon as a main component and from which the adherent mixture is removed.

Example 1

By a gas-atomizing method, a precursor serving as a carbon-containing material 11 was produced. Into a coil of a gas-atomizing apparatus (manufactured by Makabe Giken Co., Ltd.), a quartz tube packed with a MnC alloy (Mn:C=85:15 atom %) weighing 60 g was inserted. The inside of the gas atomizing apparatus was reduced to around $5 \times 10^{-2}$ Pa. Thereafter, a mixed gas of Ar and $H_2$ was flowed in to increase the internal pressure to around 111 kPa. By heating at 1400° C., the MnC alloy was molten. After the melting, the molten metal eluted from the nozzle of the quartz tube underwent the spraying of an Ar gas at a high pressure (9.5 MPa) to be crushed to be powdery, and rapidly cooled to be solidified to give a spherical MnC alloy.

Figure 4:
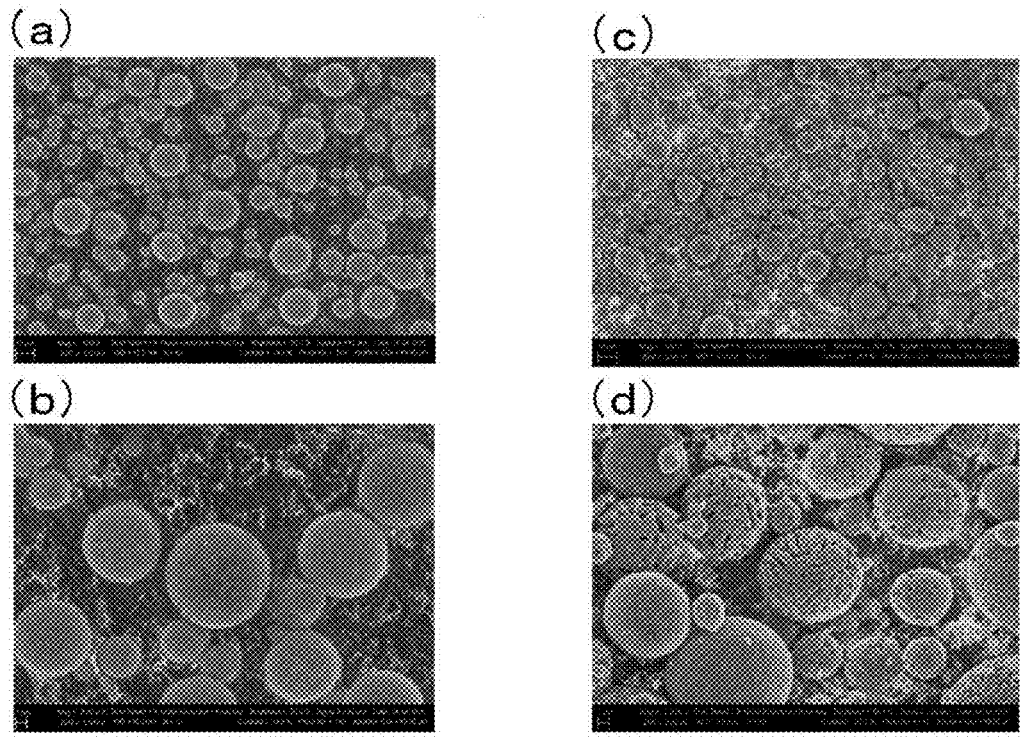
FIG. 4 includes (a) a scanning electron microscopic photograph showing a carbon-containing material; (b) a scanning electron microscopic photograph showing the carbon-containing material at a higher magnification than (a); (c) a scanning electron microscopic photograph showing an obtained porous carbon material; and (d) a scanning electron microscopic photograph showing the obtained porous carbon material at a higher magnification than (c), in a method in an embodiment of the present invention for producing a porous carbon material.

Microscopic photographs of the spherical MnC alloy obtained in this way are shown in FIGS. 4 (a) and (b). As shown in FIGS. 4 (a) and (b), the MnC alloy obtained was found to be spherical and have a particle diameter of not more than 100 μm.

Subsequently, the resultant spherical MnC alloy was used as the carbon-containing material 11 for the production of a spherical porous carbon material 13. A metal bath 12 was a Bi melt at 800° C. First, Bi having a purity of 99.99% (manufactured by Wako Pure Chemical Industries, Ltd.) weighing 150 g was introduced into a graphite crucible. The graphite crucible was inserted into a coil inside a high-frequency melting furnace ("VMF-I-I0.5 special-type" manufactured by DIAVAC LIMITED). The inside of the high-frequency melting furnace was reduced to around $5 \times 10^{-3}$ Pa. An argon gas was flowed in to increase the pressure inside the furnace to around 80 kPa, followed by heating.

The heating to 800° C. melted Bi. Thereafter, 3 g of the spherical MnC having a particle diameter of 20 to 40 μm serving as the carbon-containing material 11 was introduced into a Bi melt of the metal bath 12. The spherical MnC was held in the metal bath 12 for 10 minutes, and thereafter allowed to cool. The Mn/C/Bi composite after cooled was introduced into an aqueous nitric acid solution 15 to dissolve elements other than C, such as adherent mixtures. Subsequently, the filtration and pure-water washing were carried out. As a result, the porous carbon member 13 having C as a main component was obtained.

Microscopic photographs of the porous carbon member 13 obtained in this way are shown in FIGS. 4 (c) and (d). FIGS. 4 (c) and (d) show the obtainment of the carbon member 13 that was spherical and porous. The porous carbon member 13 obtained was found to have 91% or more of pores ranging in size between 2 to 200 nm in a volume of all pores, and have a BET specific surface area of 128 $m^2/g$.

Example 2

Figure 5:
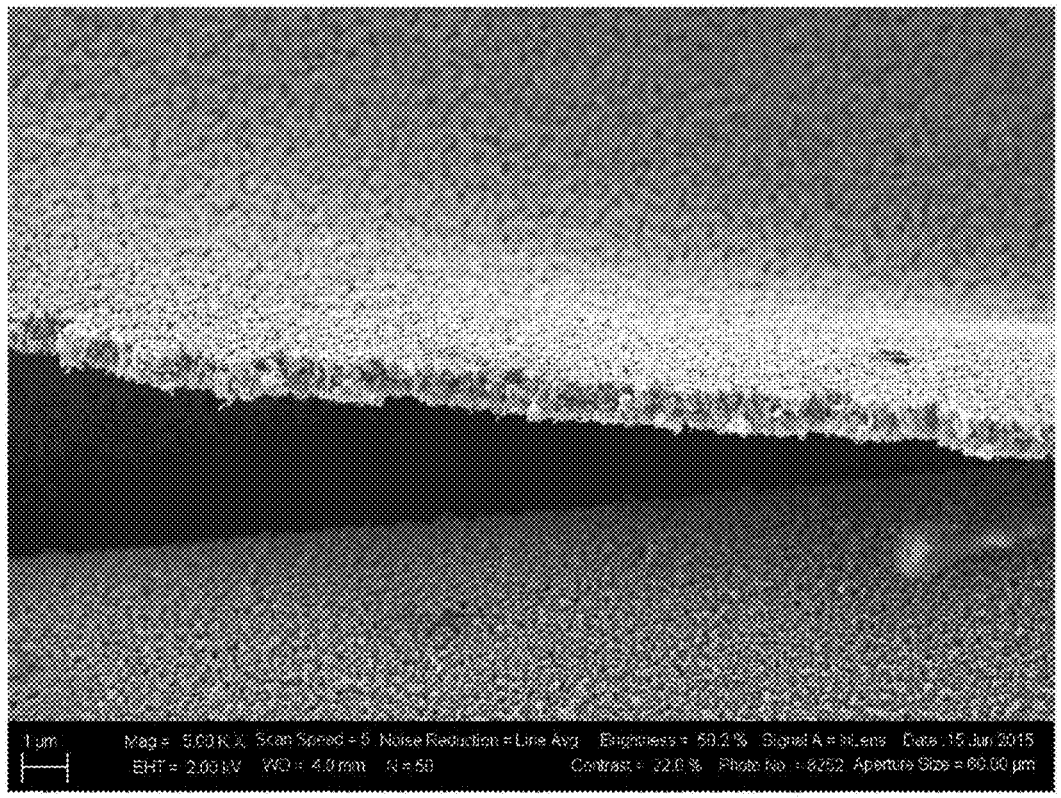
FIG. 5 includes (a) a scanning electron microscopic photograph of a sheet-shaped porous carbon member; and (b) a scanning electron microscopic photograph showing the sheet-shaped porous carbon member at a higher magnification than (a), the sheet-shaped porous carbon member being obtained by a method in an embodiment of the present invention for producing a porous carbon material.
Figure 5:
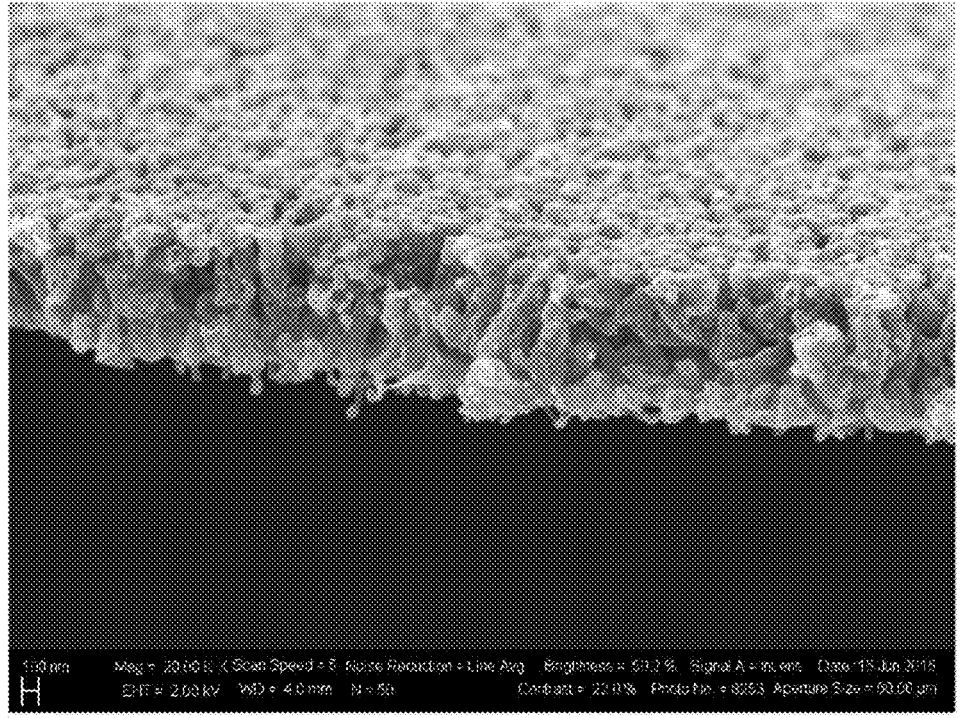
Figure 6:
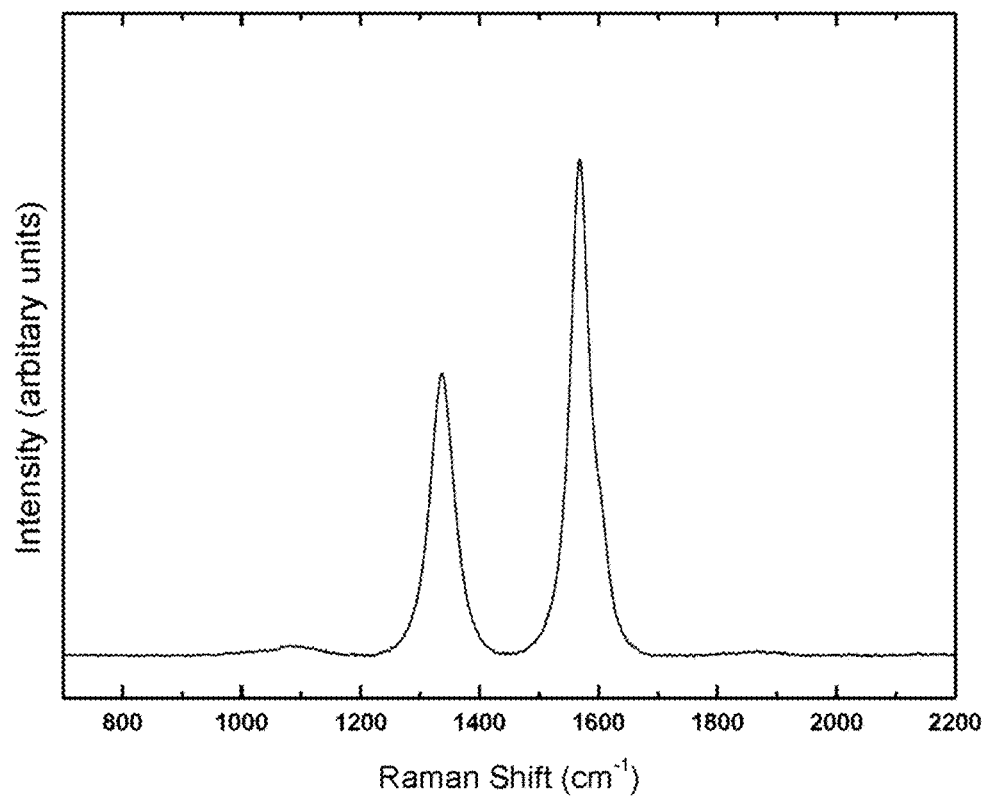
FIG. 6 illustrates a Raman spectrum of a sheet-shaped porous carbon member obtained by a method in an embodiment of the present invention for producing a porous carbon material.

A sheet-shaped porous carbon member 13 was produced. In a first production method, first of all, a precursor MnC thin film (thin film of $Mn_{85}C_{15}$), serving as a carbon-containing material 11, was formed by sputtering on a Si substrate. The whole of the Si substrate was immersed in a Bi metal bath 12 at 1100° C. for 10 minutes to give the sheet-shaped porous carbon member 13. In order for the periphery of the porous carbon member and the inside of the microvoids to be free of the remaining Mn component and Bi component, the porous carbon member 13 was immersed in an aqueous nitric acid solution 15 for 3 hours, which was followed by washing and drying. A scanning electron microscopic photograph and a Raman spectrum of the sheet-shaped porous carbon member 13 obtained in this way are shown respectively in FIG. 5 and in FIG. 6.

In a second production method, a film of Bi was formed on a Si substrate, and on the formed film, a precursor MnC thin film (thin film of $Mn_{85}C_{15}$), serving as a carbon-containing material 11, was formed by sputtering. The resultant film was subjected to temperature increase to 1100° C., and was retained for 10 minutes while promoting a dealloying reaction between Bi and the precursor. At this time, Bi was molten to become a metal bath 12, and into the metal bath 12, Mn was selectively eluted from the carbon-containing material 11, resulting in giving the carbon member 13. After the dealloying step, the whole of the Si substrate was cooled, and in order for the periphery of the carbon member and the inside of the microvoids to be free of the remaining Mn component and Bi component, the carbon member 13 was immersed in an aqueous nitric acid solution 15 for 3 hours. This was followed by washing and drying.

Not just the embodiment of the arrangement of the precursor MnC thin film on the Bi thin film, but also embodiments of the arrangement of the precursor MnC thin film in any manner are permitted as long as the MnC thin film is brought into contact with the Bi that has molten. For instance, the MnC thin film may be arranged between the Si substrate and the Bi thin film, or may be held between the Bi thin films. In the two production methods described above, a thickness of the sheet-shaped porous carbon member 13 is controllable by regulating a thickness of the precursor MnC thin film and the sputtering time for the formation of the MnC film. A size of the sheet-shaped porous carbon member is controllable by regulating a size of the Si substrate and a size of the precursor MnC thin film.

According to the method in an embodiment of the present invention for producing a porous carbon material as described above, the regulation of a temperature of a molten metal suffices in order to obtain the porous carbon material 13 having a desired shape with relative ease at a low cost.

In the method in an embodiment of the present invention for producing a porous carbon material, the metal bath 12 is not limited to Bi, but may be Ag, Cu, Ga, Ge, Hg, In, Ir, Pb, Pt, Rh, Sb, Sn or Zn, or may be composed of a mixture that is an alloy of at least one of those components as a main component. The other non-carbon main components of the precursor that is the carbon-containing material 11 are not limited to Mn, but may be composed of any one or a mixture including more than one of Al, B, Be, Ca, Ce, Cr, Dy, Er, Eu, Fe, Gd, Hf, Ho, K, La, Li, Lu, Mg, Mo, Na, Nb, Nd, Pr, Sc, Se, Si, Sm, Sr, Ta, Ti, V, W and Zr.

For instance, consideration of metal baths (melts) 12 suited for the dealloying step for representative carbon-containing materials (carbides) 11 are thought to provide such results as indicated in Table 1. Table 1 indicates the results of the considerations based on respective two-dimensional phase diagrams.

TABLE 1

| Precursor | Melting point (° C.) | Melt |
| --- | --- | --- |
| $B_4C$ | 3500 | Cu |
| $Al_4C_3$ | 2100 | Cu, Zn, Ag, Sn, Pb, Bi |
| SiC | 2730 | Cu, Ag, |
| $CaC_2$ | 2300 | Cu, Zn, Ag, Pb, Bi |
| TiC | 3170 | Cu, Zn, Ag, Sn, Pb, Bi |
| $Fe_3C$ metastable phase | 1250 | Sn |

REFERENCE SIGNS LIST

11: Carbon-containing material
12: Metal bath
13: (Porous) carbon member
14: Unreacted precursor
15: Aqueous solution

What is claimed is:

1. A method for producing a porous carbon material comprising
bringing a starting carbon-containing material having a desired shape and composed of a compound, alloy or non-equilibrium alloy containing carbon into contact with a molten metal to selectively elute non-carbon components into the molten metal while maintaining the external shape of the starting carbon-containing material to give a carbon material having microvoids, wherein
the molten metal has a solidification point that is lower than a melting point of the starting carbon-containing material, and
a temperature of the molten metal is controlled to be at a temperature that is lower than a minimum value of a liquidus temperature that is observed with respect any composition of the range of compositions that arise as a result of the starting carbon-containing material being converted into the carbon material having microvoids.

2. The method according to claim 1 for producing a porous carbon material, wherein the starting carbon-containing material is formed to have a desired shape before being brought into contact with the molten metal.

3. The method according to claim 2 for producing a porous carbon material, wherein the starting carbon-containing material is formed to be spherical by rapidly cooling to solidify a carbon-containing metal melt and thereafter the starting carbon-containing material is brought into contact with the molten metal to thereby give a spherical carbon material having microvoids.

4. The method according to claim 1 for producing a porous carbon material, wherein the starting carbon-containing material is immersed in a metal bath composed of the molten metal to thereby selectively elute the non-carbon components into the metal bath to give the carbon material.

5. The method according to claim 1 for producing a porous carbon material, wherein a solid metal having a solidification point that is lower than a melting point of the starting carbon-containing material is arranged so as to contact the starting carbon-containing material, and the solid metal is heated and turned into the molten metal to thereby selectively elute the non-carbon components into the molten metal to give the carbon material.

6. The method according to claim 1 for producing a porous carbon material, wherein the carbon material is released from the molten metal and thereafter is subjected to an acid or alkali aqueous solution to selectively elute an adherent mixture alone that adheres to a periphery of the carbon material or to an inside of the microvoids and that includes components of the molten metal and/or the non-carbon components.

7. The method according to claim 1 for producing a porous carbon material, wherein the molten metal is composed of Ag, Bi, Cu, Ga, Ge, Hg, In, Ir, Pb, Pt, Rh, Sb, Sn, or Zn, or is composed of a mixture that is an alloy of at least one of those components as a base metal of the alloy, and wherein the non-carbon components are composed of any one or a mixture including more than one of Al, B, Be, Ca, Ce, Cr, Dy, Er, Eu, Fe, Gd, Hf, Ho, K, La, Li, Lu, Mg, Mn, Mo, Na, Nb, Nd, Pr, Sc, Se, Si, Sm, Sr, Ta, Ti, V, W and Zr.

8. The method according to claim 1 for producing a porous carbon material, wherein selectively eluting the non-carbon components into the molten metal is performed in an inert atmosphere or a vacuum atmosphere, or performed in air with flux added to the molten metal.

* * * * *